United States Patent
Monteith (12)

(10) Patent No.: US 6,332,960 B1
(45) Date of Patent: Dec. 25, 2001

(54) ELECTROSTATIC FLUID PURIFYING DEVICE AND METHOD OF PURIFYING A FLUID

(75) Inventor: Robert A. Monteith, Barrie (CA)

(73) Assignee: Hydra-Static Systems Inc., Barrie (CA)

( * ) Notice: Subject to any disclaimer, the term of this patent is extended or adjusted under 35 U.S.C. 154(b) by 0 days.

(21) Appl. No.: 09/584,365

(22) Filed: Jun. 1, 2000

(51) Int. Cl.⁷ ..................................................... B01J 19/08
(52) U.S. Cl. ...................... 204/164; 422/186.4; 204/571; 204/671
(58) Field of Search .................... 204/164, 571, 204/671; 422/186.04

(56) References Cited

U.S. PATENT DOCUMENTS

| 4,073,712 | * | 2/1978 | Means et al. ......................... 204/671 |
| 4,872,959 | * | 10/1989 | Herbst et al. .................... 422/186.04 |
| 5,071,532 |   | 12/1991 | Taillet et al. ......................... 204/228 |

FOREIGN PATENT DOCUMENTS 2663865  1/1992  (FR) .

WO 99/50186  10/1999  (WO) .

* cited by examiner

*Primary Examiner*—Kishor Mayekar
(74) *Attorney, Agent, or Firm*—Dimock Stratton Clarizio; Mark B. Eisen

(57) ABSTRACT

A device and method for the treatment of fluids using electrostatic fields generated by a high voltage electric current, which reduces or eliminates calcification, scaling and microbiological contamination. A high voltage DC current is applied to a core electrode, generating an electrostatic field which traverses a dielectric sleeve surrounding the core electrode and charges the exterior surface of the dielectric sleeve, charging inorganic particles and, in the case of a biological contaminant such as bacteria, killing the organism. Fluid flowing through the device is agitated by a combination of spiral vane sections surrounding the dielectric sleeve and helical baffle sections lining the housing wall. Charged inorganic particles coalesce into spherical aggregates which resist adhesion to pipes and vessels and can be filtered by techniques such as reverse osmosis without deteriorating the filter membrane. The device can thus be used to pre-treat water so as to enhance the performance and durability of purification systems such as reverse osmosis filtration systems.

5 Claims, 5 Drawing Sheets

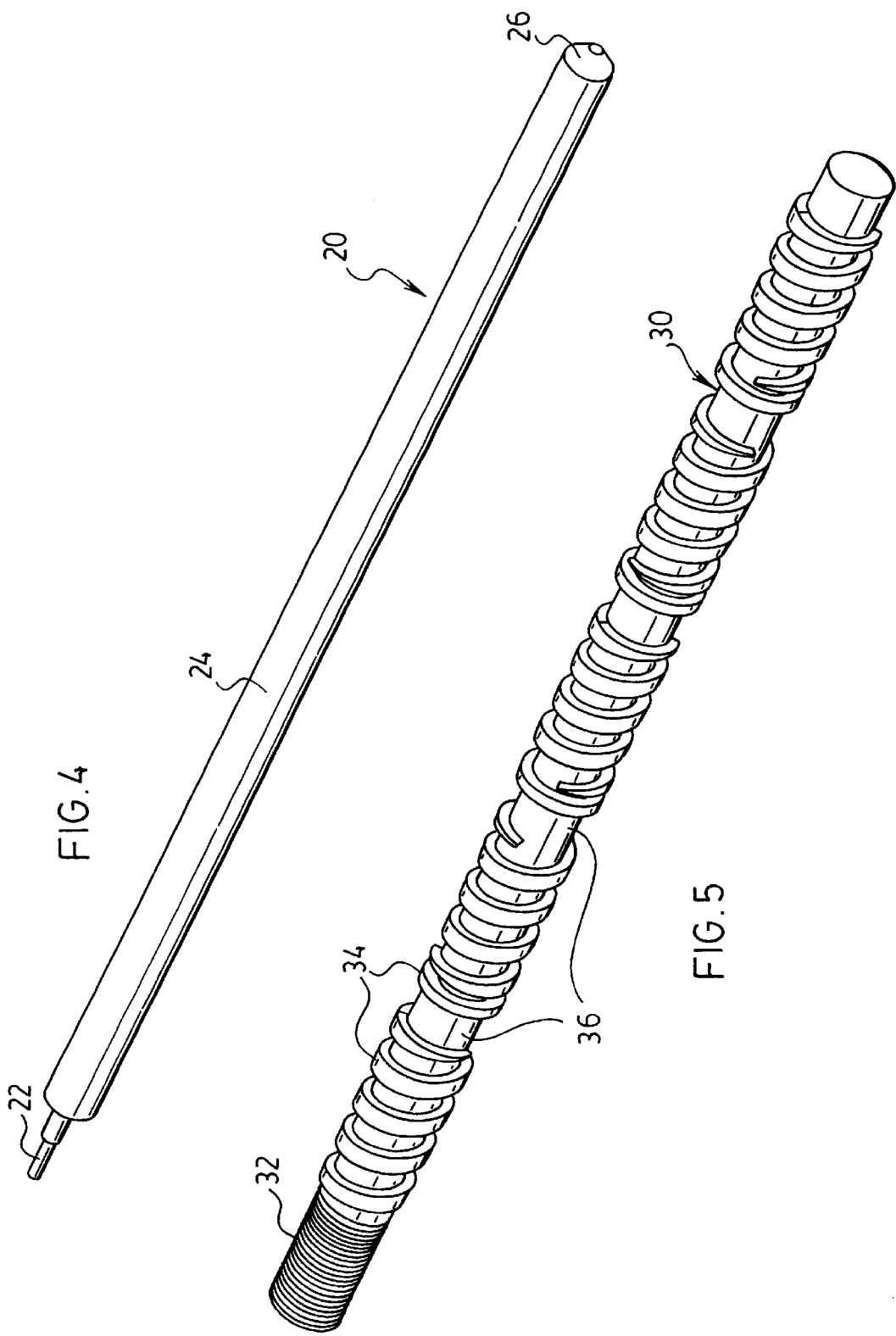

ELECTROSTATIC FLUID PURIFYING DEVICE AND METHOD OF PURIFYING A FLUID

FIELD OF INVENTION

This invention relates fluid treatment systems. In particular, this invention relates to a device and method for purifying a fluid through the application of electrostatic fields.

BACKGROUND OF THE INVENTION

Fluid purification systems are used in many different types of applications. Water purification techniques are widely used in both open and closed-loop water systems to reduce levels of contaminants and to maintain conditions suitable for habitation, for example washing and bathing, leisure activities such as swimming. Perhaps most important, such systems are used to create potable water from various water sources which may contain different kinds of organic and inorganic contaminants that are unsuitable for human consumption, or even dangerous.

Both open- and closed-loop water systems, such as aqueduct networks, water towers, ice machines and particularly hot water systems such as boilers, vapour humidifiers and the like, are prone to calcification, scale formation and contamination by many types of biological contaminants. The nature and extent of these problems varies depending upon the water chemistry and the type of water system. In many cases, a large portion of the cost of maintaining a water system is devoted to the elimination of minerals and contamination caused by microbiological pollutants such as bacteria, endotoxins, moulds, parasites, fungus and viruses.

The purification of large volumes of water by conventional techniques has conventionally been costly and problematic. Chemical treatments tend to have undesirable side effects, and can actually be harmful if precise conditions are not maintained. Mechanical filtration is probably the most common method of water purification, but it is substantially limited both in terms of the rate at which water can be purified and the useful life of the filter used in the system.

Reverse osmosis filtration is one of the most effective filtration techniques. In a typical reverse osmosis filtration system, water is forced through a semi-permeable membrane to extract pollutants and contaminants. Reverse osmosis systems provide an extremely effective level of filtration initially, but this tends to degrade quickly as the membrane deteriorates and becomes clogged with contaminant particles.

In water treatment systems the filter membrane is subject not only to clogging by fine particles, but also tends to become positively charged as electrons are shed into the passing water, and the charged membrane actually attracts and holds neutral particles such as calcium carbonate, exacerbating clogging of the membrane. Moreover, reverse osmosis filter membranes require continual replacement as a result of constant wear and tear from undesirable elements, for example some types of inorganic contaminants, such as calcium carbonate, which coalesce in water systems to form sharp, needle-like structures that pierce and erode the filter membrane. This significantly limits the life of the membrane and results in a slowly deteriorating output water quality and filtration rate.

Reverse osmosis filter membranes are so sensitive that in many environments, once the efficiency of the filter membrane drops by as little as 2% the membrane must be replaced. Thus, reverse osmosis filter membranes must be replaced on a regular basis, which is very costly.

It is known to treat and/or pre-treat fluids such as water with electrostatic fields, to eliminate biological pollutants and reduce calcification and scaling in water circulation systems. However, there has previously been no system capable of efficiently and effectively treating fluids such as water in large volumes, or for treating fluids such as water for prolonged intervals without the need for continuous maintenance and replacement of filter membranes.

It would accordingly be advantageous to provide a system capable of reducing or eliminating mineralization and biological contamination in fluid circulation and distribution systems. It would further be advantageous to provide a system which effectively pre-treats a fluid prior to filtration, to reduce the harmful effects of contaminants on the filter membrane and thus prolong the useful life of the membrane.

SUMMARY OF THE INVENTION

The present invention provides a device and method for the treatment of fluids using electrostatic fields generated by a high voltage electric current. The device of the invention can be built into new water systems or retrofitted to existing water systems, to reduce or eliminate calcification, scaling and microbiological contamination, and to pre-treat water so as to enhance the performance and durability of purification systems such as reverse osmosis filtration systems.

The invention accomplishes this by applying a high voltage DC current to a core electrode, generating an electrostatic field which traverses a dielectric sleeve surrounding the core electrode and charges the exterior surface of the dielectric sleeve. The charge remains on the dielectric sleeve until transferred to a contaminant particle entrained in the fluid, charging inorganic particles and, in the case of a biological contaminant such as bacteria, killing the organism. Fluid flowing through the device is agitated by a combination of spiral vane sections surrounding the dielectric sleeve and helical baffle sections lining the housing wall. Charged inorganic particles coalesce into spherical aggregates, rather than the sharp needle-like structures which form naturally in water systems, and can be filtered by techniques such as reverse osmosis without deteriorating the filter membrane. Moreover, the inorganic microspheres retain the charge imparted by the device and are thus repelled by a reverse osmosis filter membrane, facilitating removal of the contaminants from the filtration chamber.

In open- and closed-loop circulation and distribution systems such as cooling towers, ice machines, boilers and the like, the inorganic spheres resist adhesion to pipes and vessels. The system of the invention thus reduces or eliminates biological contaminants as well as both calcification and scaling.

The device and method of the invention are particularly suitable for the purification of water in both open- and closed-loop circulation and distribution systems, and for the pre-treatment of water in water filtration systems, such as reverse osmosis systems, to increase the efficiency and consistency of the filtration process and reduce maintenance and filter replacement costs.

The present invention thus provides device for purifying a fluid, comprising a housing having a fluid inlet and a fluid outlet spaced from the fluid inlet, an electrode core disposed within the housing for connection to a high voltage electrical power supply, a dielectric sleeve disposed about the electrode core, the dielectric sleeve having an exterior surface comprising at least one spiral vane section for agitating a fluid flowing through the housing, and at least one ground electrode disposed within the housing spaced from the dielectric sleeve, wherein a high voltage electric current applied to the core electrode generates an electrostatic field which traverses the dielectric sleeve and imparts a charge to contaminants entrained in the fluid.

The present invention further provides a method of purifying a fluid, comprising the steps of forcing the fluid through a housing containing a core electrode surrounded by a dielectric sleeve, and at least one ground electrode spaced from the dielectric sleeve, agitating a fluid flowing through the housing by at least one spiral vane section provided on an exterior surface of the dielectric sleeve, and applying a high voltage electric current to the core electrode, wherein the high voltage electric current generates an electrostatic field which traverses the dielectric sleeve and imparts a charge to contaminants entrained in the fluid.

In further aspects of the invention the ground electrode comprises a plurality of ground electrode rings surrounding the dielectric sleeve; the ground electrode rings are fixed in spaced relation within a baffle assembly comprising at least one helical baffle section for agitating a fluid flowing through the housing; the dielectric sleeve comprises a plurality of spiral vane sections separated by gaps coincident with the ground electrode rings; a pitch of the baffle is directed opposite to a pitch of the vane section; and/or a tip of the core electrode is tapered to a truncated cone shape.

These and other features of the invention will be apparent from the detailed description which follows.

BRIEF DESCRIPTION OF THE DRAWINGS

In drawings which illustrate by way of example only a preferred embodiment of the invention.

FIG. 4 is a perspective view of an electrode core for the fluid purifying device of FIG. 1;

FIG. 5 is a perspective view of a dielectric sleeve for the fluid purifying device of FIG. 1;

DETAILED DESCRIPTION OF THE INVENTION

Figure 1:
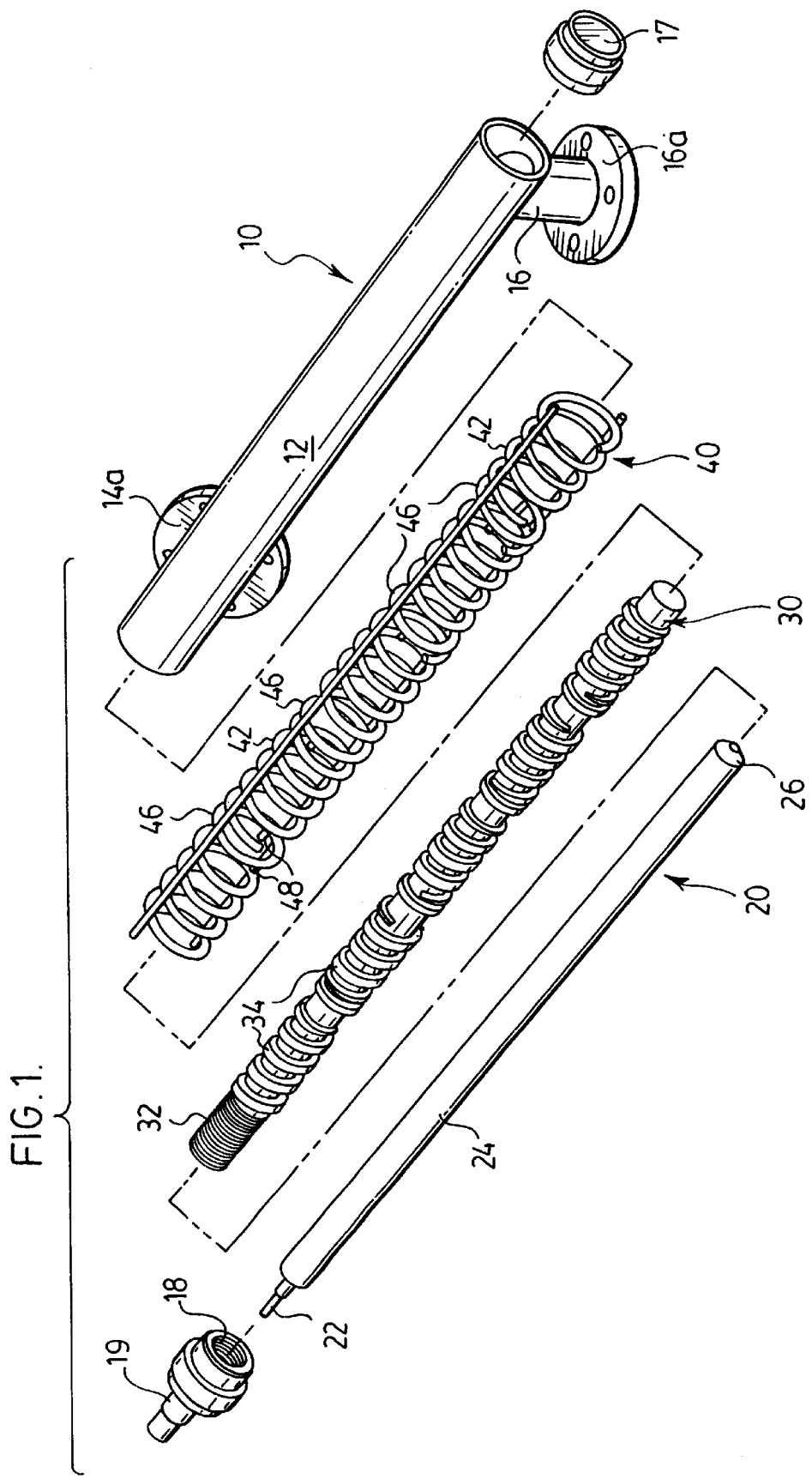
FIG. 1 is an exploded perspective view of a fluid purifying device according to the invention.

A preferred embodiment of the device of the invention is illustrated in FIG. 1. The invention will be described in the context of a water purifying embodiment of the device, in which the device is most advantageously employed, however it will be appreciated that the device may be used to treat other types of liquids and the invention is not intended to be restricted to the particular applications described.

Figure 2:
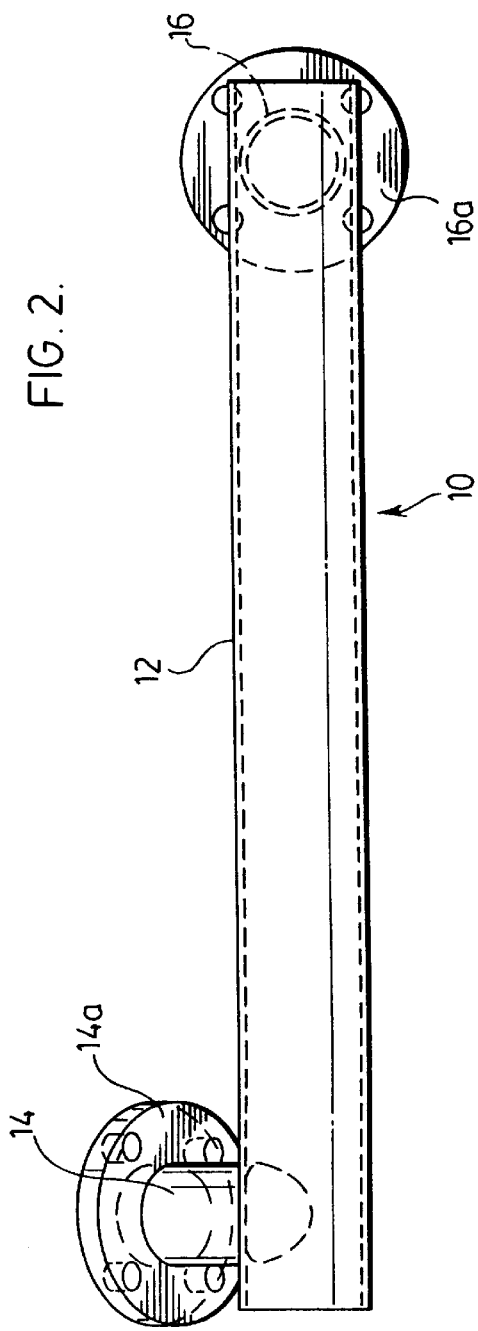
FIG. 2 is a side elevation of the fluid purifying device of FIG. 1.
Figure 3:
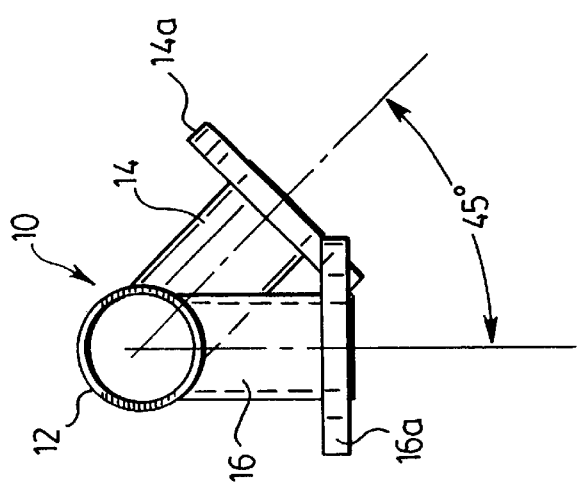
FIG. 3 is an end elevation of the fluid purifying device of FIG. 1.

A housing 10, illustrated in FIGS. 2 and 3, comprises a hollow stainless steel tube 12 having a fluid inlet 14 and a fluid outlet 16 spaced from the inlet 14 longitudinally along the tube 12. Preferably the inlet 14 comprises a flange 14a and the outlet 16 comprises a flange 16a for securing the housing 10 to a water system, for example a boiler, cooling tower, vaporizer, swimming pool and the like. The device 10 may be retrofitted to an existing water system by interposing the device at a suitable location in the system, or may be integrated into a new water system.

Thus, the tube 12 provides a fluid-impermeable enclosure for fluid communication between the fluid inlet 14 and the fluid outlet 16. The housing 10 is composed of stainless steel to avoid corrosion, and is formed thick enough to withstand the pressures of the water system in which it will be used. The precise locations and positions of the fluid inlet and outlet 14, 16 are a matter of selection. The inlet 14 may be oriented radially offset from the outlet 16, to increase the turbulence of the fluid flowing through the housing 10.

The housing 10 contains a core electrode 20, illustrated in FIG. 4, having a terminal 22 for connection to a conductor from a high voltage electrical power supply (not shown), a conductive body 24 preferably extending substantially the length of the housing 10, and a tip 26 which is preferably tapered to a truncated cone to facilitate a smooth breakdown of the electrostatic field about the tip 26 of the core electrode 20. Optimally the axial length of the cone at the tip 26 should be approximately equal to one half of the circumference of the core electrode 20, to facilitate a smooth breakdown of the electrostatic field at the tip 26 of the core electrode 20. The core electrode 20 may be dimensioned as desired, and in the preferred embodiment is formed with a thickness capable of carrying a DC current ranging from 14 kV to 50 kV.

Figure 6:
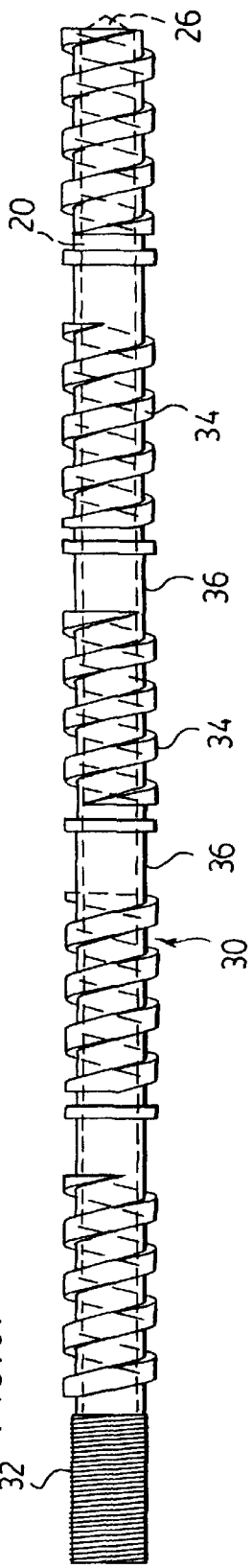
FIG. 6 is a side elevation of the dielectric sleeve of FIG. 5.

The core electrode 20 is disposed within a dielectric sleeve 30, illustrated in FIG. 5. The core electrode 20 (shown in phantom in FIG. 6) fits snugly within the dielectric sleeve 30, which preferably extends along substantially the entire length of the core electrode 20. The dielectric sleeve 30 is preferably composed of a tightly knit or woven dielectric material, for example condensed virgin Teflon, which provides very small, sparsely spaced pores to inhibit electric arcing through the dielectric sleeve 30.

The dielectric sleeve 30 preferably has a threaded end 32 adjacent to the terminal 22 of the core electrode 20 for attachment to an end cap 18, and in the preferred embodiment provides a series of spiral vane sections 34 for generating turbulence in the water passing from the fluid inlet 14 to the fluid outlet 16. Gaps 36 are disposed between the spiral vane sections 34, for reasons which are described below.

Figure 7:
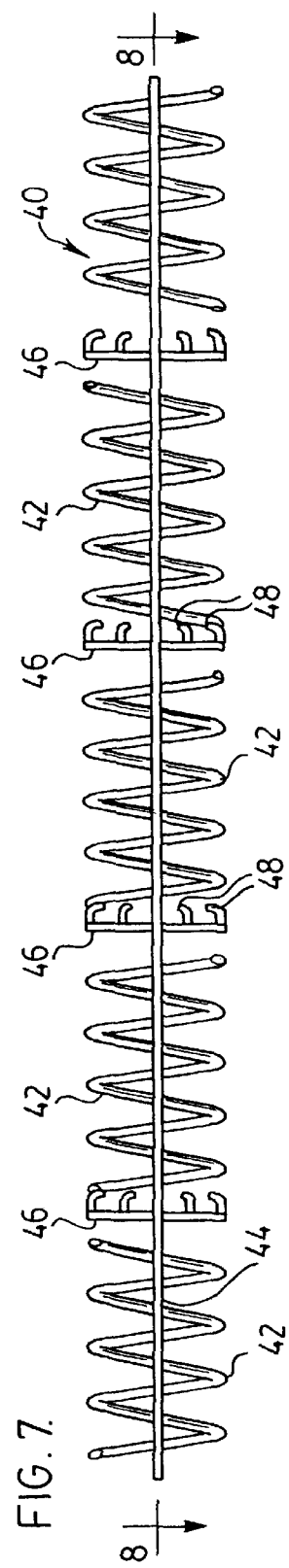
FIG. 7 is a side elevation of a baffle assembly for the fluid purification device of FIG. 1.
Figure 8:
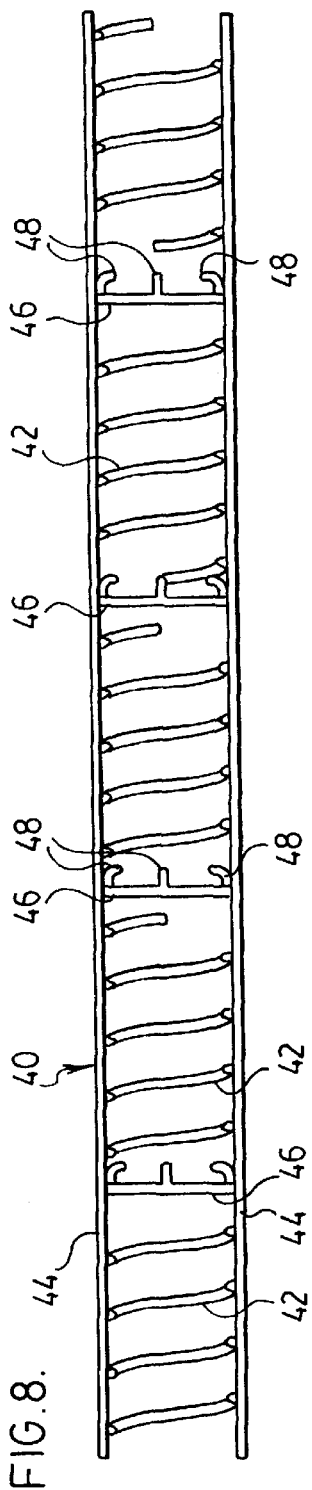
FIG. 8 is a top plan view of the baffle assembly of FIG. 7.

A baffle assembly 40, illustrated in FIGS. 7 and 8, comprises a series of helical baffle sections 42 connected by rods 44 extending axially through the baffle sections 42 and optionally welded thereto. Interspersed between the helical baffle sections 42, preferably at substantially evenly spaced intervals, are ground electrode rings 46, oriented substantially radially within the baffle assembly 40 and each providing a plurality of ground electrode needles 48. The components in the baffle assembly 40 are preferably composed of stainless steel.

The ground electrode needles 48 are preferably evenly spaced about the ground electrode rings 46 and have electrode tips 48a which are preferably tapered to a sharp point to improve the transfer of electricity through each needle 48. The tips 48a of the needles 48 are preferably oriented toward electrostatic sleeve 30, and are coincident with the positions of the gaps 36 between the vane sections 34.

As is known to those skilled in the art, contaminated water is more conductive than pure water. The tips 48a of the ground electrode needles 48 are thus spaced from the dielectric sleeve 30 by a sufficient distance that the electric current will not arc spontaneously, but will flow between the dielectric sleeve 30 and the tips 48a of the ground electrode needles 48 only when contaminants are present in the water. However, the tips 48s of the ground electrode needles 48 should be close enough to the dielectric sleeve 30 that in the presence of contaminants an electric current will flow between the tips 48a and the dielectric sleeve 30 at the selected applied voltage. For example, it has been determined that a distance of 50 to 70 mm between the tips 48a of the ground electrodes 48 and the dielectric sleeve 30 is optimal for the purification of many types of effluent at a voltage in the range of 40 kV to 300 kV. At these voltage levels arcing between the ground electrode needles 48 and the gaps 34 along the dielectric sleeve 30 will not create a corona effect, due to the removal of electrons by contaminates and the cooling effect of the fluid.

To assemble the device of the invention, the baffle assembly 40 is inserted into the housing 10 and preferably welded to the interior of the tube 12. The core electrode 20 is inserted into the electrostatic sleeve 30, which is in turn inserted into the housing 10 and retained spaced from the baffle assembly 40, preferably coaxially, by stainless steel end caps 17, 18 (shown in FIG. 1) welded or otherwise suitably affixed to the housing 10. A high voltage cable 5 (shown in FIG. 9) from a generator or other electrical power source is coupled to the terminal 22 of the core electrode 20, and an insulating terminal casing 19 is applied over the connection, which may be sealed with epoxy to ensure water-tightness.

The conductor in the high voltage cable is surrounded by an insulating material, preferably a crosslink polyethylene because of its high density and low cost. The insulator may in turn be surrounded by a braided concentric neutral, which must be spaced or insulated from the housing 10. The housing 10 in turn is grounded.

In operation, a high voltage, low amperage DC current is applied to the terminal 22 of the core electrode 20, inducing an electric field surrounding the core electrode 20. A three phase DC voltage is preferred, because at any time one phase is always at or near the peak voltage, resulting in a more consistent electrostatic field.

The electric current creates an electrostatic filed which traverses the dielectric sleeve 30. The applied voltage is selected to be positive or negative, depending upon the environment (e.g. the composition of the vessels and conduits in the system) and the types of contaminants sought to be eliminated from the water. Where a positive voltage is applied to the core electrode 20, the exterior surface of the dielectric sleeve 30 becomes negatively charged, and vice versa. The dielectric sleeve retains charged particles, in the case of a positive applied voltage, by accumulating electrons over the exterior surface of the dielectric sleeve 30, until the charge is removed by a passing particle entrained in the fluid.

Particulate matter (inorganic or biological contaminants) contact the dielectric sleeve 30, pick up the charge and become ionized and polarized. In the case of biological contaminants such as bacteria, a sufficient density of electrons will kill the bacteria very effectively. In the case of inorganic contaminants such as calcium and heavy metals, the charge polarizes the particles and causes the particles to aggregate into small spheres, which can then be effectively filtered by a downstream filtration system (for example a reverse osmosis filter) without clogging or destroying the filter membrane. Moreover, the positive or negative charge of the dielectric sleeve (depending upon whether the applied voltage is negative or positive, respectively) which is picked up by the spheres is retained in aggregate form, and because the filter membrane quickly takes on the same charge as the fluid is filtered, the spheres are actually repelled from the filter membrane. The aggregate falls to the bottom of the filter housing and can be readily removed by a mechanical device, for example a differential switch, or by routine maintenance procedures.

The purifying effect of the device of the invention can be maximized by increasing the number of ground electrodes, which can be accomplished by increasing the number of ground electrodes 48 on each ground electrode ring 46, or by increasing the number of ground electrode rings 46. Purification is also enhanced with increased turbulence in the fluid; for example, it will be noted that the pitch of the spiral vane sections 34 is opposite to the pitch of the helical baffle sections 42, which further agitates the fluid and thus increases the degree of turbulence of the fluid as it progresses through the housing 10. This is less important in closed circulation systems, since over time the water is repeatedly pumped through the purifying system. However, in an open-loop water distribution system it is important to agitate the fluid as much as possible as it traverses the device, to maximize exposure of contaminants to the electrostatic field.

The gaps 36 between vane sections 43 on the dielectric sleeve 30 provide a uniform surface from which the ground electrodes 48 are spaced, and thus a balance is achieved between the number of ground electrode rings 46 and the number of turns in the vane sections 34 and 42. In the embodiment shown for the purification of water at a DC voltage of 14 to 18 kilovolts, four ground electrode rings 46 each support six ground electrode needles 48, and interspersed between the rings 46 along the axial length of the housing 10 are the vane sections 34 and 42.

The device of the invention can operate at any DC voltage, preferably ranging from 14 kV to 50 kV. In most circulation systems using metal pipes a positive voltage is most effective, imparting a negative charge to contaminant particles which will thereafter repel from the walls of pipes (which are at ground potential).

Although most water circulation and distribution systems will dictate a unidirectional flow through the housing, it is also possible to alternate between forward and reverse fluid flows. The locations and orientations of the fluid inlet 14 and fluid outlet 16 are a matter of selection as may be suitable for a particular installation. In the embodiment shown the fluid inlet 14 and fluid outlet 16 are radially offset, which allows for devices to be more readily interposed into existing water systems.

Figure 9:
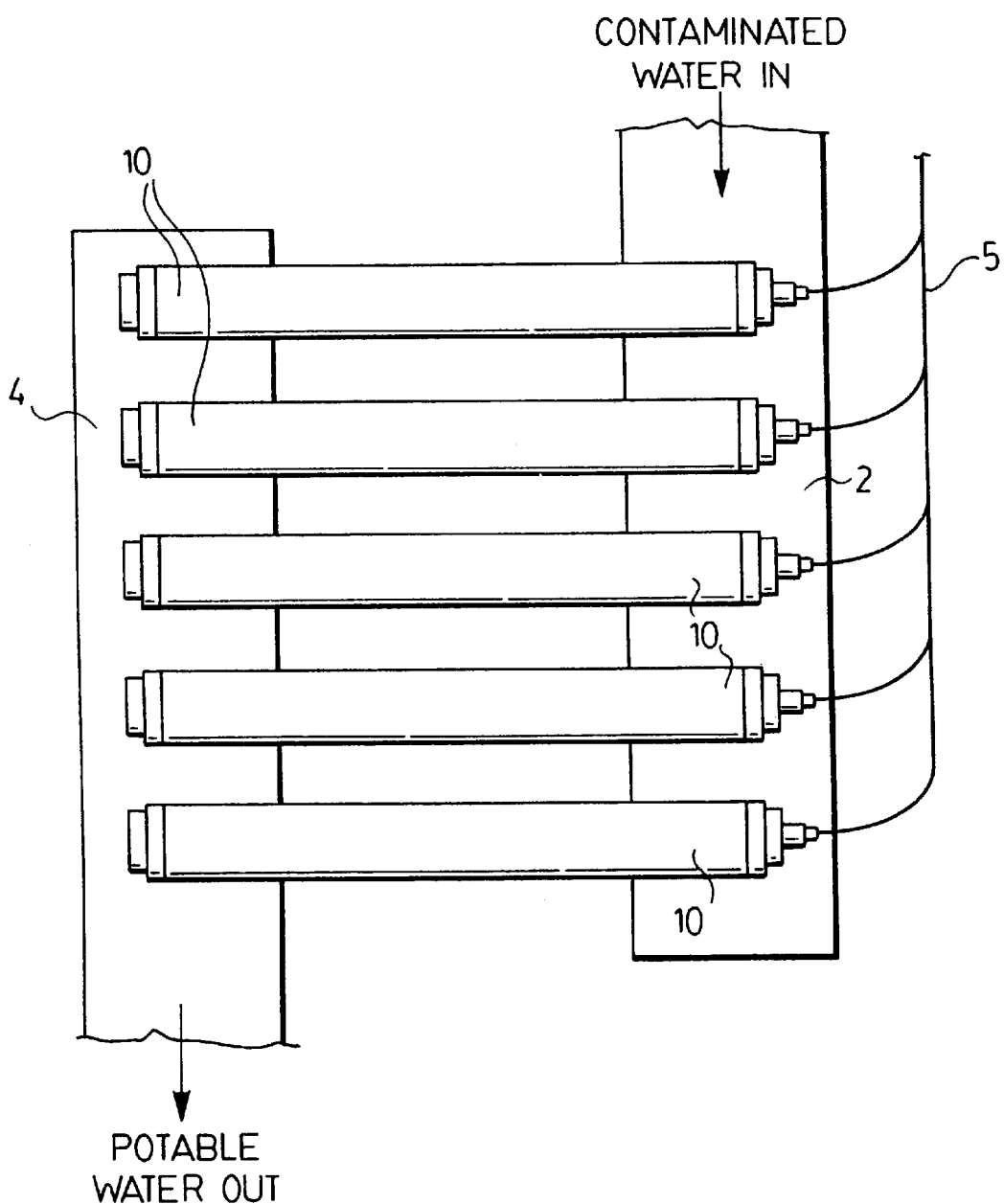
FIG. 9 is a schematic illustration of a water purifying system embodying multiple fluid purification devices.

In a system where large purified fluid output is desired, for example in a potable water system from a contaminated water source, a plurality of devices of the invention can be coupled in parallel fashion between the contaminated water input and the clean water output, for example as illustrated in FIG. 9. Thus, the device of the invention can be manufactured in a single size, or a small number of standard sizes, that the purification rate can be increased as desired simply by increasing the number of devices in the line. Each device can be controlled independently to thereby control the output flow rate of purified water, up to the maximum output flow rate dictated by the incoming pipe 2 and outgoing pipe 4 in the water system.

In the case of biological contaminants, it is possible to achieve a 100% kill rate by utilizing a high voltage, for example in the order of 50 kV. At this voltage there is a sufficient electron density on the surface of the dielectric sleeve 30 to destroy high volumes of bacteria in a very short time. The pitch of the winds 42 in the helical baffle 40 is preferably 10%, and rotating the applied DC potential at this angle can result in a charge accumulation that can generate a voltage of over 1 MV. At this voltage level water molecules break down in the region between the tips 48a of the ground electrodes 48 and the surface surrounding the gaps 36 of the dielectric sleeve. As the water egresses from this region the water molecules recombine and in the process can trap oxygen molecules infused into the fluid before it enters the housing 10, thus providing a well oxygenated potable water supply that resists the growth of anaerobic microorganisms. The method and device of the invention can thus produce high volumes of oxygenated water, at concentrations which may be as high as 250 ppm, and the water will remain oxygenated for prolonged periods.

This technique can also be used to oxygenate medical solutions, for example saline or plasma, prior to introducing the solution to a patient. This technique can also be used to treat sulphur water, by adding small amounts of liquid oxygen to the fluid before it enters the housing 10; the combination of exploding ions and the presence of oxygen can reduce or entirely eliminate the sulphur content of the fluid.

At very high voltages corona effect can occur between the tips 48a of the ground electrodes 48 and the exposed surface of the dielectric sleeve 30, which is also effective at killing bacteria. Again, in this case increased turbulence in the water flowing through the housing increases the likelihood that biological contaminants entrained in the water will pass through the corona effect.

The method and device of the invention can thus be used to eliminate scale in high- and low-pressure water systems. In water cooling towers the invention not only eliminates scale and kills microorganisms, it can reduce water consumption by reducing evaporation and "blow-down" (perfectly good potable water introduced into the cooling tower to dilute the concentration of total dissolved solids, which is ideally maintained at a maximum of 1,500 ppm). The method and device of the invention can maintain concentrations of total dissolved solids at around 800–900 ppm, substantially reducing the wastage of potable water as blow-down, and reducing evaporation by removing the heat carried by the excess dissolved solids.

The method and device of the invention can be used instead of chemical oxidants in swimming pools, and the killing residual of water treated by the device can last significantly longer than chemical treatments, depending upon the microorganism density at the start of treatment. The method and device of the invention has also been found to kill zebra mussel larvae, and can thus be implemented at the openings to electric generators and the like to reduce or prevent constriction of the water intake.

The method and device of the invention can also be employed for the cleaning and recycling of resins used in scrubbers for smoke stacks. Resins are commonly used to remove pollutants from smoke stack exhaust gases, because resins hold a charge (either positive or negative) very effectively and can thus be used to attract particulate contaminants suspended in a gas. However, in order to be recycled for reuse the resin must be cleaned and a charge must be reapplied to the resin molecules, which is conventionally effected through an acid washing process using sulphuric acid. Sulphuric acid washing is an expensive and ecologically harmful procedure, and acid washing does not charge the resin effectively. The method and device of the invention can not only pre-treat resin for the filtration of contaminant particles previously extracted from a gas, but simultaneously recharges the resin very efficiently for reuse.

Various embodiments of the present invention having been thus described in detail by way of example, variations and modifications will be apparent to those skilled in the art. The invention includes all such variations and modifications as fall within the scope of the appended claims.

I claim:

1. A device for purifying a fluid, comprising a housing having a fluid inlet and a fluid outlet spaced from the fluid inlet, an electrode core disposed within the housing for connection to a high voltage electrical power supply, a dielectric sleeve disposed about the electrode core, the dielectric sleeve having an exterior surface comprising at least one spiral vane section for agitating a fluid flowing through the housing, and at least one ground electrode comprising a plurality of ground electrode rings surrounding the dielectric sleeve and disposed within the housing spaced from the dielectric sleeve, the ground electrode rings being fixed in spaced relation within a baffle assembly comprising at least one helical baffle section for agitating a fluid flowing through the housing, a pitch of the baffle section being directed opposite to a pitch of the vane section, wherein a high voltage electric current applied to the core electrode generates an electrostatic field which traverses the dielectric sleeve and imparts a charge to contaminants entrained in the fluid.

2. The device of claim 1 in which the dielectric sleeve comprises a plurality of spiral vane sections separated by gaps coincident with the ground electrode lings.

3. The device of claim 1 in which a tip of the core electrode is tapered to a truncated cone shape.

4. A method of purifying a fluid, comprising the steps of:

(a) forcing the fluid through a housing containing a core electrode surrounded by a dielectric sleeve, and at least one ground electrode comprising a plurality of ground electrode rings spaced from the dielectric sleeve and fixed in spaced relation within a baffle assembly comprising at least one helical baffle section for agitating a fluid flowing trough the housing, (b) agitating a fluid flowing through the housing by at least one spiral vane section provided on an exterior surface of the dielectric sleeve and by the baffle section, a pitch of the baffle section being directed opposite to a pitch of the vane section, and (c) applying a high voltage electric current to the core electrode, wherein the high voltage electric current generates an electrostatic field which traverses the dielectric sleeve and impart a charge to contaminants entrained in the fluid.

5. The method of claim 4 in which the dielectric sleeve comprises a plurality of spiral vane sections separated by gaps coincident with the ground electrode rings.

* * * * *